United States Patent [19]

Hartelius

[11] 4,260,165
[45] Apr. 7, 1981

[54] SHAFT SEAL, INTENDED FOR USE AT HIGH TEMPERATURES

[75] Inventor: Nils M. Hartelius, Gothenburg, Sweden

[73] Assignee: AB Volvo, Gothenburg, Sweden

[21] Appl. No.: 67,520

[22] Filed: Aug. 17, 1979

[30] Foreign Application Priority Data

Aug. 22, 1978 [SE] Sweden ............................ 7808857

[51] Int. Cl.³ ..................... F16D 65/00; F16J 15/32; F16J 15/38
[52] U.S. Cl. ........................................ 277/84; 277/85; 277/92; 277/95; 277/152; 277/186; 277/189
[58] Field of Search ..................... 277/38, 42, 43, 85, 277/84, 88, 90, 92, 95, 152, 153, 166, 181, 185, 186, 189

[56] References Cited

U.S. PATENT DOCUMENTS

| 2,898,132 | 8/1959 | Guérin | 277/95 X |
| 3,279,803 | 10/1966 | Sekulich | 277/95 X |
| 3,493,645 | 2/1970 | Sanderson et al. | 277/152 X |

FOREIGN PATENT DOCUMENTS

| 246032 | 7/1963 | Australia | 277/179 |
| 2554840 | 6/1976 | Fed. Rep. of Germany | 277/95 |
| 195513 | 6/1965 | Sweden . | |
| 399747 | 2/1978 | Sweden . | |
| 1444080 | 7/1976 | United Kingdom | 277/95 |

*Primary Examiner*—Robert S. Ward, Jr.
*Attorney, Agent, or Firm*—Young & Thompson

[57] ABSTRACT

A shaft seal intended to function at high temperatures with an elastic sealing ring carried by a retainer ring of e.g. stainless steel which has an L-shaped section. From the axial portion of the retainer ring, radially inwardly directed supporting tongues extend, providing a small contact surface against the shaft element which supports the seal. The supporting tongues are pressed against a radial supporting surface on the shaft element by an elastic ring between the retainer ring and an opposing supporting surface on the shaft element. These supporting surfaces may be the two radial end surfaces of a peripheral groove in the shaft element.

5 Claims, 3 Drawing Figures

U.S. Patent
Apr. 7, 1981
4,260,165
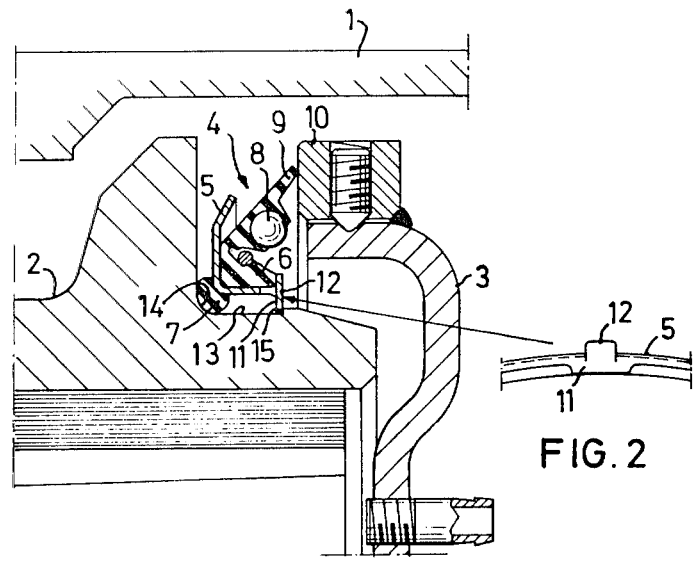
FIG.1
FIG.2
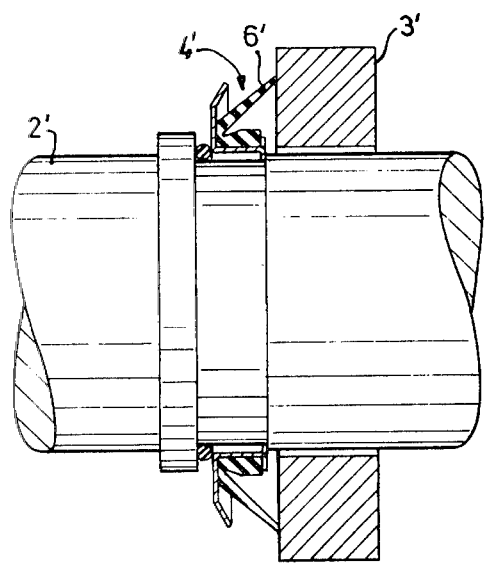
FIG. 3

SHAFT SEAL, INTENDED FOR USE AT HIGH TEMPERATURES

The present invention relates to a shaft seal, intended to function at high temperatures and comprising a sealing ring of flexible material, which is arranged to form a seal between two elements which are rotatable relative to one another and which is mounted on a retainer ring with an essentially L-shaped section.

Seals of the above-mentioned type, which are subjected to high temperatures, are used in, among other things, brake drums for motor vehicles, especially cross-country vehicles, where the seals are used to prevent water, mud and other contaminants from penetrating into the brake drum through the gap between the drum and the shield. A known seal of this type is described in Swedish Lay-open Print No. 399 747, for example. In this seal the retainer ring is made of asbestos or similar material to protect the sealing ring from the heat generated in the brake drum. In this seal the entire axial portion of the retainer ring is in contact with the external surface of the drum. It has been determined however, that this construction does not provide sufficient protection against heating of the sealing ring. Thus, in spite of having an asbestos or similar retainer ring, the sealing ring is heated so much that it loses its ability to achieve an effective seal between the drum and the shield.

The purpose of the present invention is generally to achieve a shaft seal of the type described in the introduction, in which the sealing ring in a more effective manner than previously is protected against heating. A special purpose here is to achieve a seal which is especially suited to use in vehicle brakes.

This is achieved according to the invention by virtue of the fact that from the axial portion of the retainer ring, radially inwardly directed supports extend which are disposed to be pressed against a radial supporting surface on a first one of the elements with the aid of a ring of elastic material disposed between the retainer ring and a second opposing support surface on said first element.

This construction can substantially reduce the contact surface between the retainer ring and the element which supports the retainer ring, e.g. a shaft or brake drum, as compared with the above-mentioned known embodiment, which results in substantially reduced heat transfer from the drum to the retainer ring. The supports can be relatively short with relatively large spaces along the periphery without leakage occurring between the retainer ring and the element supporting the retainer ring. The flexible ring between the retainer ring and said element (e.g. a brake drum) has the dual function of serving as a resilient member to press the retainer ring against the supporting surface and of serving as a seal between the retainer ring and the element.

The invention will now be described in more detail with reference to embodiments shown in the accompanying drawing, in which FIG. 1 shows an axial section through a drum brake for a vehicle with a shaft seal according to the invention, FIG. 2 is an end view of a portion of the retainer ring of the seal in FIG. 1, and FIG. 3 is an axial section through an embodiment of the seal according to the invention arranged on a shaft.

In FIG. 1, 1 designates a portion of a wheel rim, 2 a portion of a brake drum joined to the rim 1, and 3 a portion of a stationary brake shield. Between the drum 2 and the shield 3, a seal is arranged (generally designated 4), which is designed to prevent contaminants from penetrating into the drum 2 through the gap between the drum and the shield 3.

The seal 4 consists of three main parts, namely a retainer ring 5 of thin-walled material with relatively low heat conductivity, e.g. stainless steel, a sealing ring 6 of flexible material, e.g. rubber, supported by the retainer ring 5, and an O-ring 7 of flexible material with high heat resistance, e.g. silicon rubber or fluorocarbon rubber. The seal is of the type described in the previously mentioned Swedish Lay-open Print No. 399 747, i.e. a seal which is sensitive to centrifugal force with ballast members in the form of lead balls 8 placed inside the sealing lip 9 so that the lip 9, when the drum achieves a certain relatively low rotational speed, breaks contact with a ring 10 screwed onto the shield 1.

As is evident from FIG. 1, the retainer ring 5 has an essentially L-shaped section. The outer end of the axial portion of the ring 5 has radially directed tongues 11, which are evenly distributed along the periphery and rest with their interior end surfaces against the external surface of the drum 2. In the embodiment shown (see especially FIG. 2) the tongues have relatively small dimensions along the periphery, and at least three tongues are required. The number of tongues serving as supports and their dimensions along the periphery can vary, however, depending on the application. The axial end portion of the retainer ring 5 is also provided with U-shaped cut-outs, from which outwardly directed tongues 12 are folded, which form axial outer supports for the sealing ring 6.

The retainer ring 5 is held in place in a shallow groove 13 in the external surface of the drum with the aid of the O-ring 7, which lies pressed between one end wall 14 of the groove and the retainer ring 5, and thus the tongues 11 of the ring press against the opposite end wall 15 of the groove. This construction makes the assembly very simple, since after the O-ring is forced on, the retainer ring need then only be forced over the drum until the tongues 11 snap into the groove 13.

FIG. 3 shows a seal 4' mounted on an ordinary shaft 2' and sealing against a schematically indicated machine element 3'. The seal 4' differs from the previously described embodiment only in that its sealing ring 6' lacks ballast balls.

What I claim is:

1. Shaft seal, intended to function at high temperatures and comprising a sealing ring of flexible material, which is arranged to form a seal between two elements rotatable relative to one another and which is mounted on a retainer ring with an essentially L-shaped cross section, characterized in that from the axial portion of the retainer ring, radially inwardly directed supports extend, which are disposed to be pressed against a radial supporting surface on a first one of the elements with the aid of a ring of elastic material disposed between the retainer ring and a second opposing support surface on said first element.

2. Shaft seal according to claim 1, characterized in that the retainer ring is thin-walled and consists of a material with relatively low heat conductivity such as stainless steel, the supports being formed of at least three uniformly distributed tongues bent inward from the outer end of the axial portion of the L-shaped section.

3. Shaft seal according to claim 2, characterized in that the outer end of the axial portion of the L-shaped section also has radially outwardly directed tongues for axially fixing the sealing ring on the retainer ring.

4. Shaft seal according to claim 1, characterized in that the ring disposed between the retainer ring and said opposing supporting surface is made of silicon rubber, fluorocarbon rubber or the like.

5. Shaft seal according to claim 1, characterized in that the retainer ring is intended to be mounted on a brake drum, the sealing ring having a ballasted sealing lip which is designed, below a certain rotational speed of the drum, to seal against a stationary member such as a brake shield.

* * * * *